US010474298B2

(12) United States Patent
Curtis

(10) Patent No.: US 10,474,298 B2
(45) Date of Patent: Nov. 12, 2019

(54) CAPACITIVE BASED GESTURE INPUT SYSTEM

(71) Applicant: Microchip Technology Incorporated, Chandler, AZ (US)

(72) Inventor: Keith Edwin Curtis, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 596 days.

(21) Appl. No.: 13/831,517

(22) Filed: Mar. 14, 2013

(65) Prior Publication Data

US 2014/0267138 A1 Sep. 18, 2014

(51) Int. Cl.
*G06F 3/044* (2006.01)

(52) U.S. Cl.
CPC .................................... *G06F 3/044* (2013.01)

(58) Field of Classification Search
None
See application file for complete search history.

(56) References Cited

U.S. PATENT DOCUMENTS

| 5,729,219 | A | 3/1998 | Armstrong et al. ............ 341/20 |
| 7,705,834 | B2 | 4/2010 | Swedin ......................... 345/174 |
| 8,390,587 | B2 | 3/2013 | Fan et al. ...................... 345/173 |
| 8,531,431 | B2 | 9/2013 | Swedin ......................... 345/174 |
| 2007/0046639 | A1* | 3/2007 | Swedin ............... G02F 1/13338 |
| | | | 345/173 |
| 2008/0238883 | A1* | 10/2008 | Akiyama ............ G02F 1/13338 |
| | | | 345/174 |
| 2008/0243806 | A1* | 10/2008 | Dalal ............... H04M 1/274558 |
| 2009/0262085 | A1* | 10/2009 | Wassingbo et al. |
| 2012/0013567 | A1 | 1/2012 | Hung et al. .................... 345/174 |
| 2012/0256866 | A1 | 10/2012 | Yu et al. ........................ 345/173 |
| 2012/0268669 | A1 | 10/2012 | Ishikawa et al. ............... 349/12 |
| 2013/0176251 | A1* | 7/2013 | Wyatt ....................... G09G 5/18 |
| | | | 345/173 |

FOREIGN PATENT DOCUMENTS

| CN | 201754273 U | 3/2011 | ............ G06F 3/044 |
| CN | 102117156 A | 7/2011 | ............ G06F 3/044 |
| EP | 2104023 A2 | 9/2009 | ............ G06F 3/041 |
| KR | 200462862 Y1 | 10/2012 | ............ G06F 3/044 |
| TW | 417935 U | 1/2001 | ............ G06F 3/033 |
| TW | 201203060 A | 1/2012 | ............ G06F 3/044 |
| TW | 397849 B | 6/2013 | ............ G06F 3/044 |
| WO | 2005/036510 A1 | 4/2005 | ............ G02F 1/133 |

(Continued)

OTHER PUBLICATIONS

International Search Report and Written Opinion, Application No. PCT/US2014/019724, 13 pages, dated Jun. 11, 2014.

(Continued)

*Primary Examiner* — Parul J Gupta

(74) *Attorney, Agent, or Firm* — Slayden Grubert Beard PLLC

(57) ABSTRACT

A liquid crystal display with integrated capacitive touch sensors has an LCD display with at least one alphanumerical or graphic symbol, and at least one capacitive touch sensor arranged above a display layer or within transparent layers of the LCD display forming the alphanumerical or graphical symbol.

24 Claims, 7 Drawing Sheets

(56) References Cited

FOREIGN PATENT DOCUMENTS

WO     WO 2005036510 A1 *   4/2005   ............... G09G 3/00

OTHER PUBLICATIONS

European Office Action, Application No. 14711098.5, 9 pages, dated Nov. 17, 2016.
Taiwan Office Action, Application No. 103108285, 5 pages, dated Jul. 13, 2017.
European Office Action, Application No. 14711098.5, 11 pages, dated Aug. 9, 2017.
Chinese Office Action, Application No. 201480011441.X, 19 pages, dated Nov. 16, 2018.

* cited by examiner

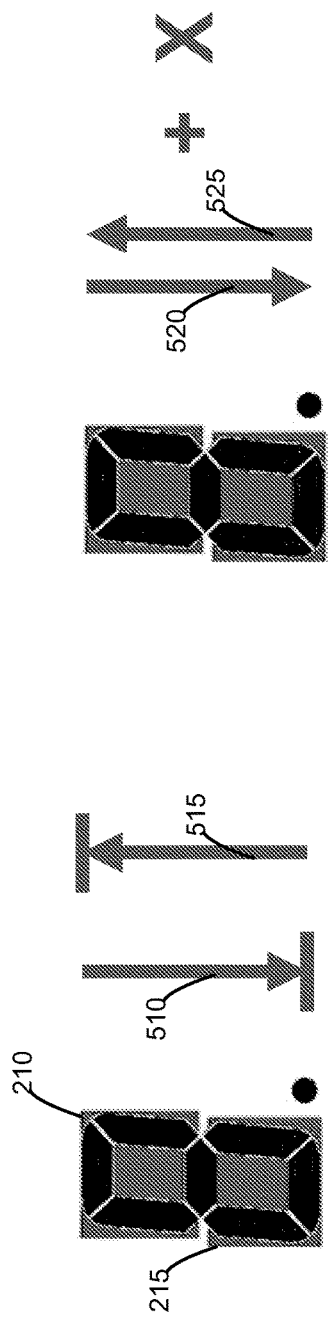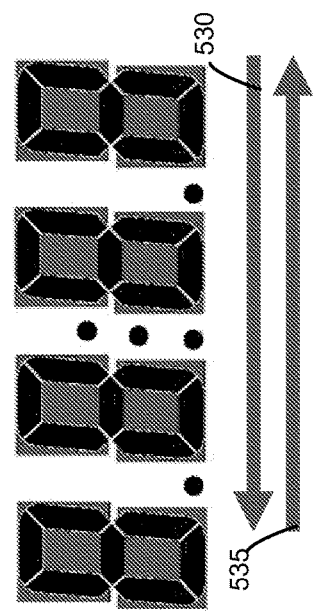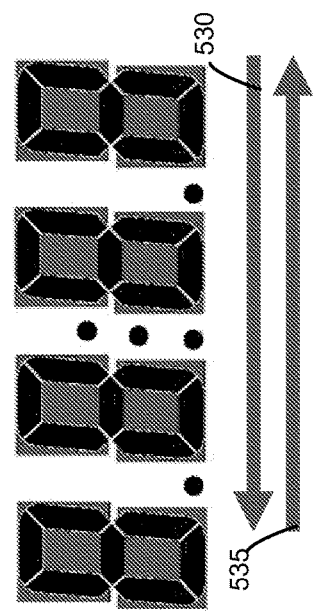

CAPACITIVE BASED GESTURE INPUT SYSTEM

TECHNICAL FIELD

The present disclosure relates to a human device interface, in particular a capacitive based gesture input system.

BACKGROUND

Current low bandwidth user interface systems involve 2 or more buttons for numeric input, coupled with chord combinations of keys for seldom used commands. These systems are not intuitive, and require either prior knowledge of the system or the time to experiment with the controls. Designers often want the flexibility of touch screen user inputs but the cost of a graphics liquid crystal display (LCD) screen with touch screen is prohibitive in low cost applications.

SUMMARY

There exists a need for a low cost human device interface in particular a capacitive based gesture input system with advanced input capabilities.

According to an LCD display with integrated capacitive touch sensors may comprise an LCD display comprising at least one alphanumerical or graphic symbol; and at least one capacitive touch sensor arranged above a display layer or within transparent layers of the LCD display forming the alphanumerical or graphical symbol.

According to a further embodiment, the capacitive touch sensor can be formed within a transparent layer integrated within the LCD display. According to a further embodiment, the capacitive touch sensor can be arranged on top of a glass layer of the LCD display. According to a further embodiment, the capacitive touch sensor can be formed by a display segment of the LCD display. According to a further embodiment, the display segment can be a common drive electrode of the LCD display. According to a further embodiment, the at least one touch sensor can be coupled with an external pin of the LCD display. According to a further embodiment, the LCD may further comprise at least two capacitive touch sensor pads associated with the at least one numerical or graphic symbol. According to a further embodiment, the at least two capacitive touch sensor pads can be shaped such to provide for a slider functionality. According to a further embodiment, the alphanumerical symbol can be a 7-segment display or a dot-matrix character display.

According to another embodiment, a system may comprise an LCD display as described above and a controller for driving said LCD display and for evaluating the at least one touch sensor. According to a further embodiment of the system, the LCD display may comprise a plurality of touch sensors and wherein the controller is configured to determine a gesture by means of the plurality of touch sensors. According to a further embodiment of the system, the controller may further be configured to alter the display according to a determined gesture. According to a further embodiment of the system, the plurality of touch sensors can be used to form at least one of, a touch button, a slider, and a gesture determination button. According to a further embodiment of the system, the controller and LCD display may form a module. According to a further embodiment of the system, the module can be a chip on glass module. According to a further embodiment of the system, the controller can be a microcontroller.

According to yet another embodiment, a method for determining and evaluating an input performed by touching an LCD display may comprise: arranging a plurality of touch sensor pads above at least a numeric or graphic symbol of the LCD display or within transparent layers of the LCD display; determining a touch of at least one touch sensor pad or a gesture performed across at least two adjacent touch sensor pads; and providing feedback by altering at least one display element of the LCD display.

According to a further embodiment of the method, two touch sensor pads can be arranged above a display element or within a transparent layer of the LCD display and when a gesture in which a finger slides from the bottom to the top is detected, the feedback comprises displaying an increased number or a next character in a sequence of characters. According to a further embodiment of the method, two touch sensor pads can be arranged above a display element or within a transparent layer of the LCD display and when a gesture in which a finger slides from the top to the bottom is detected, the feedback comprises displaying an decreased number or a previous character in a sequence of characters. According to a further embodiment of the method, a plurality of number can be displayed wherein each number comprises at least one associated sensor pad and wherein displayed numbers are shifted from left to right through the plurality of numbers if a gesture is detected in which a finger slides from left to right over the plurality of numbers and wherein displayed numbers are shifted from right to left through the plurality of numbers if a gesture is detected in which a finger slides from right to left over the plurality of numbers. According to a further embodiment of the method, each gesture may shift the display numbers by one and wherein a last number to the left or right is dropped and a first number to the right or left, respectively is filled with a zero. According to a further embodiment of the method, two touch sensor pads can be arranged above a display element and when a gesture is detected in which a finger slides from the bottom to the top and further away from the top, the feedback comprises displaying a sequence of increased numbers or next characters in a sequence of characters until a further touch of one of the two sensor pads is detected. According to a further embodiment of the method, two touch sensor pads can be arranged vertically above a display element and when a gesture is detected in which a finger slides from the top to the bottom and away from the bottom, the feedback comprises displaying a sequence of decreased numbers or previous characters in a sequence of characters until a further touch of one of the two sensor pads is detected.

BRIEF DESCRIPTION OF THE DRAWINGS

FIG. 5A-C shows different possible gesture implementations;

DETAILED DESCRIPTION

Figure 1:
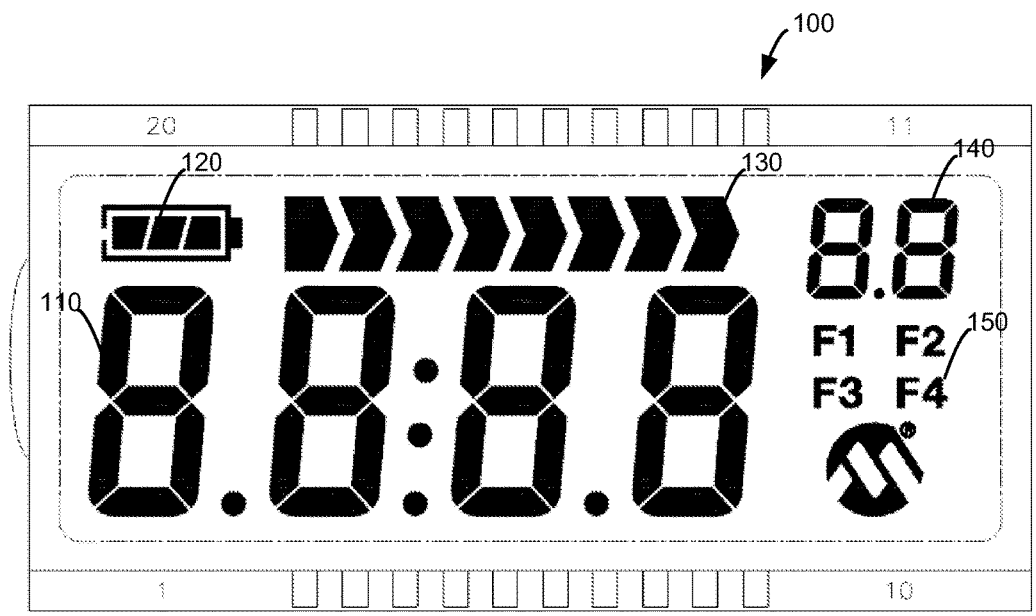
FIG. 1 shows a conventional LCD display.

According to various embodiments, a touch screen like interface using for example less expensive segmented liquid crystal displays (LCD) and a lower cost button based capacitive touch input can be provided. FIG. 1 shows a typical conventional low cost LCD with for example, 20 pins. The LCD may comprise a plurality of 7-segment main numbers 110 arranged for example to display a time, and secondary 7-segment numbers 140, for example to indicate any type of value as a real or integer number, graphical symbols 120, 130 such as bar graphs, etc. and other fields 150 indicate certain operating modes. The LCD may or may not include a controller. The embodiment as shown in FIG. 1 may be a low cost display without a specific controller which for example can be driven by a microcontroller with integrated LCD controller directly without any additional circuitry.

Figure 2:
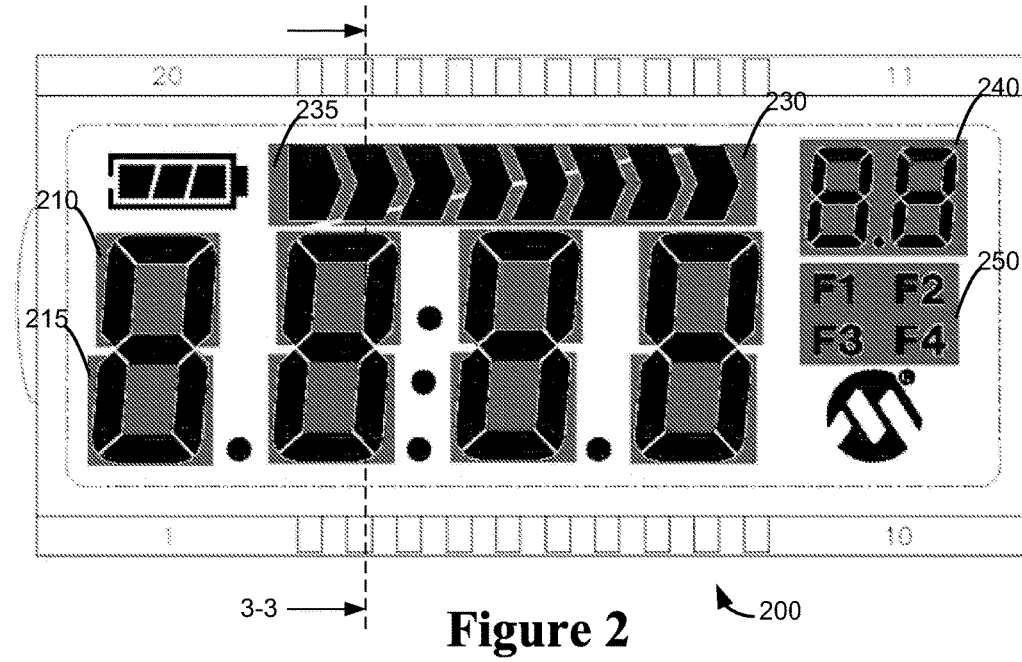
FIG. 2 shows an improved LCD display according to various embodiments.

FIG. 2 shows the same LCD with the addition of sensor fields to allow a direct input functionality by touching or approaching the display. According to various embodiments, touch sensors 210-250 are placed over the digits/sliders/indicators on a segment LCD display. According to other embodiments, the sensor elements can be placed anywhere within the LCD display as long as they are only covered by transparent layers of the LCD. Yet alternatively, transparent segments within the LCD display, for example, common drice segments can be used to also operate as sensor elements. Respective switching logic must then be integrated within the LCD display.

FIG. 2 shows an embodiment in which the sensor elements are arranged above the display or within the transparent layers of the display. Thus, for example, two triangular shaped sensor segments 230 and 235 can be arranged over the segmented bar graph symbol 130 to provide for a slider input function. A normal button function can be provided by sensor pad 240 arranged over the secondary 7-segment number display 240 and a toggle function by sensor pad 250 arranged over function field 150. The single digits of the main display numbers 110 may comprise each two touch sensor pads 210, 215 arranged over the respective number. According to various embodiments the user touches/swipes the sensors to toggle indicators, increment/decrement digits, or adjust sliders as will be explained in more detail below. In addition, according to some embodiments as stated above, the respective sensor elements could also be placed within the transparent layers of an LCD or use existing segment elements, in particular common drive segments.

Figure 3:
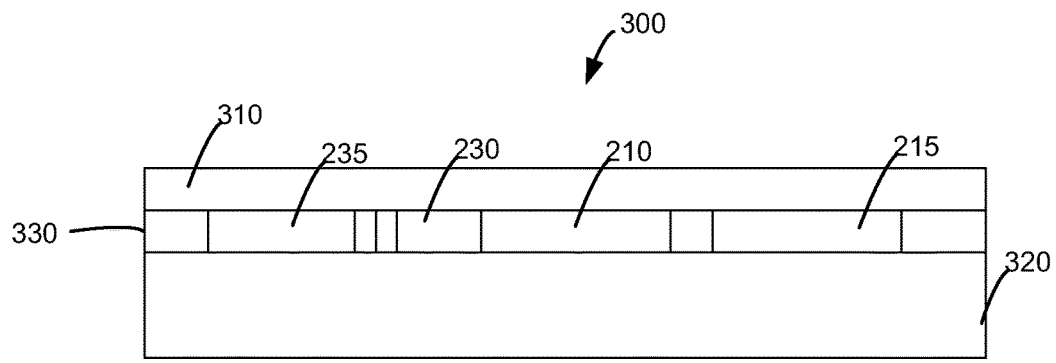
FIG. 3 shows a sectional view of a first embodiment along line 3-3 shown in FIG. 2, FIG. 4A,B show a sectional view of a further embodiments along line 3-3 shown in FIG. 2.
Figure 4A:
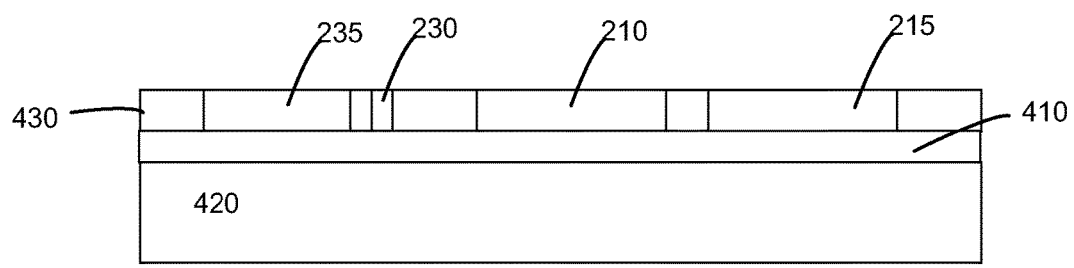
Figure 4B:
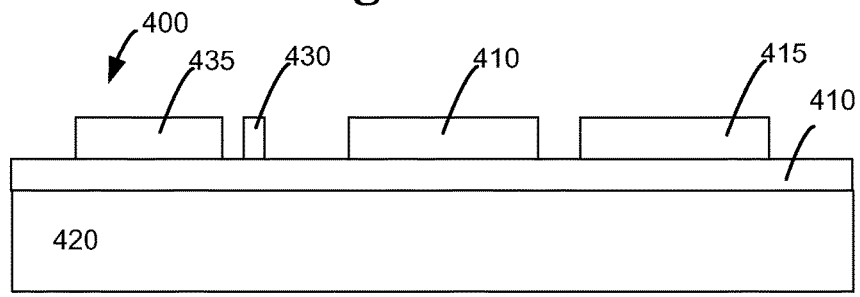

As shown in more detail in FIGS. 3 and 4A, B, the sensor pads can be added above or within the actual liquid crystal layers of the LCD. Thus, they can be either an integral part as shown in FIGS. 3 and 4A or an add-on layer as shown in FIG. 4B. FIG. 3 shows an additional transparent layer 330m, such as indium tin oxide, arranged between the top glass 310 and the actual liquid crystal display layers 320 of LCD 300 and thus forms an integrated version. Layer 330 can be patterned to form the individual sensor pads. FIG. 4A shows another embodiment in which the capacitive sensor pads are added on top of an LCD display glass layer 410 in form of an additional layer 430. Here, a patterned transparent layer 430 could be added on the top glass of the LCD. Alternatively, as shown for example in FIG. 4B individual sensor pads could be placed on the top glass of the LCD to cover the respective fields as shown in FIG. 2. For example, a flexible adhesive layer could carry individual transparent metal sensor pads and be attached to the top of a glass substrate of the LCD.

Depending on the technology, it may be practical to integrate the sensor layer arranged within the actual display of the LCD module as shown in FIG. 3. According to some embodiments, existing segments, such as segments of a display or a common drive segment which could be located under an associated LCD segment could be used wherein the LCD comprises respective switching circuitry to allow to use such segments as sensor segment. The sensor can be printed on the top glass of the LCD according to some embodiments and connected using flexible silver ink printed tapes and vertically conductive adhesives. The system can use antimony tin oxide (ATO) or indium tin oxide (ITO) forming the respective electrodes according to some embodiments.

Figure 6:
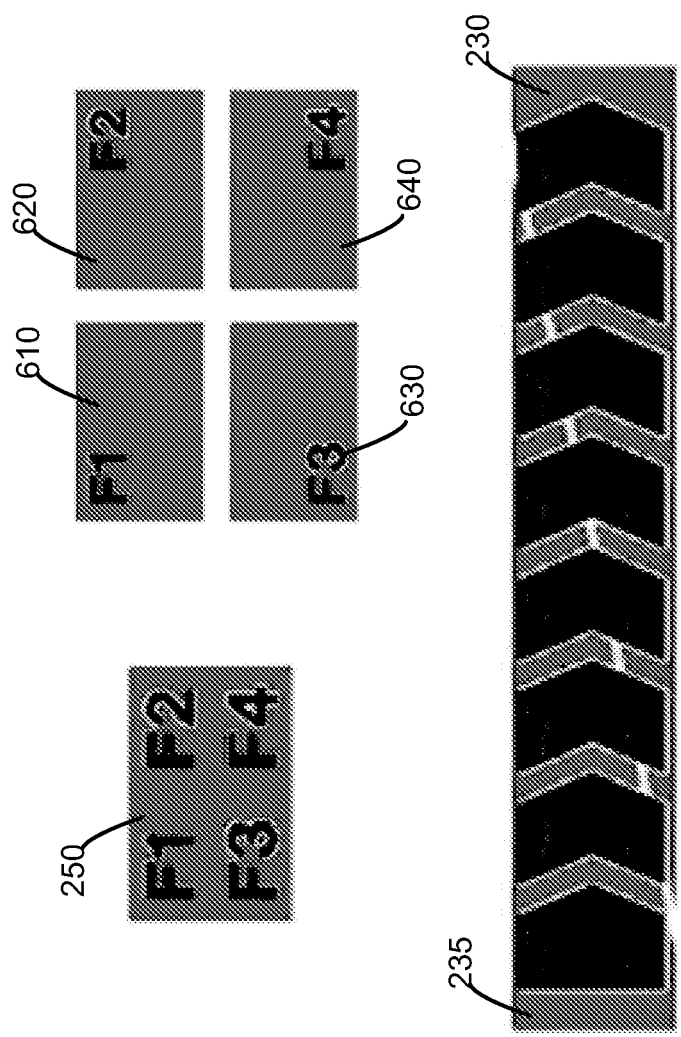
FIG. 6 shows details of further and alternative possible sensor plate arrangements.

According to various embodiments, for a 7-segment LCD numbers or a dot-matrix character, two capacitive sensor plates may be provided and can be arranged to cover a top and bottom part of the 7-segment number as shown in FIG. 2 and in more detail in FIGS. 5A-C. However, as shown in the upper right corner of FIG. 2 a single capacitive sensor pad 240 can cover one or more digits or characters, for example of the secondary numerical display 140. A function field 150 may also have an associated single sensor pad 250 or a plurality of individual sensor pads 610-640 associated with each symbol or number of a field 150 as shown in FIG. 6. Moreover, a capacitive slider functionality can be provided by arranging of two for example triangular pads 230 and 235 as shown in the top region of the LCD 200 in FIG. 2 or FIG. 6. Again, these sensor elements could be formed for example, by existing common drive segments already present under the respective LCD segment.

According to an embodiment, a controller can be provided to evaluate a capacitive touching of the display. Such a controller can be either integrated with the LCD or be a separate device coupled with the LCD. The controller can be configured to evaluate a touching of the display and provide a resulting event signal which for example could be fed to a host or further processed within the controller. To this end, the controller may comprise circuitry such as a peripheral that provides for capacitive touch sensor detection and evaluation. For example, a charge time measurement unit could be provided, a relaxation oscillator, or any other method of determining a capacitive touch, as known in the art. Moreover, for sensor arrangements under/over a number, character or graphic symbol with more than one sensor pad, a more complex evaluation can be provided that results in determining whether a specific gesture has been made when touching the display. FIGS. 5A-C show a variety of exemplary gestures that can be detected by such a controller. For example, to increase a single digit, the user touches the bottom of a digit and draws their finger up the display as indicated by arrow 515 in FIG. 5A. According to one embodiment, if the user stops at the top of the display, the value is incremented by one. If the user touch continues past the top of the display as indicated by arrow 525 in FIG. 5B, the value continues to increment until the digit is touched a second time as indicated by the "X" in FIG. 5B. According to further embodiment, the speed of the swipe may determine the rate of increment. Single increments can also be accomplished by tapping the top sensor pad 210 of the digit. To decrease a single digit, for example, the user touches the top of the digit and draws their finger down as shown with arrow 510 or 520 in FIGS. 5A and 5B, respectively. According to various embodiments, single and continuous decrement may operate in the same manner as the increment function explained above.

According to a further exemplary embodiment as shown in FIG. 5C, if the user draws their finger from the left most digit to the right as indicated by arrow 535 in FIG. 5C, the value shifts down through the digits with the right most values 'falling off'. According to a further embodiment, if the user draws their finger from the right most digit to the left as indicated by arrow 530 in FIG. 5C, the value shifts up through the digits with the right most value back filled with zeros.

Further exemplary embodiment will be discussed below:

For Individual indicators (F1, F2, F3 & F4) as shown in the top area of FIG. 6: When the user touches the transparent capacitive touch sensor over the indicator, the touch detector peripheral or software running in the controller registers the touch and toggles the state of the indicator. In particular, if already existing LCD segments are used as sensor elements, then multiplexing can be used to provide display and sensing functionality at the same time. To avoid any type of flicker, the switching can be performed fast enough to be invisible for the human eye.

Figure 7:
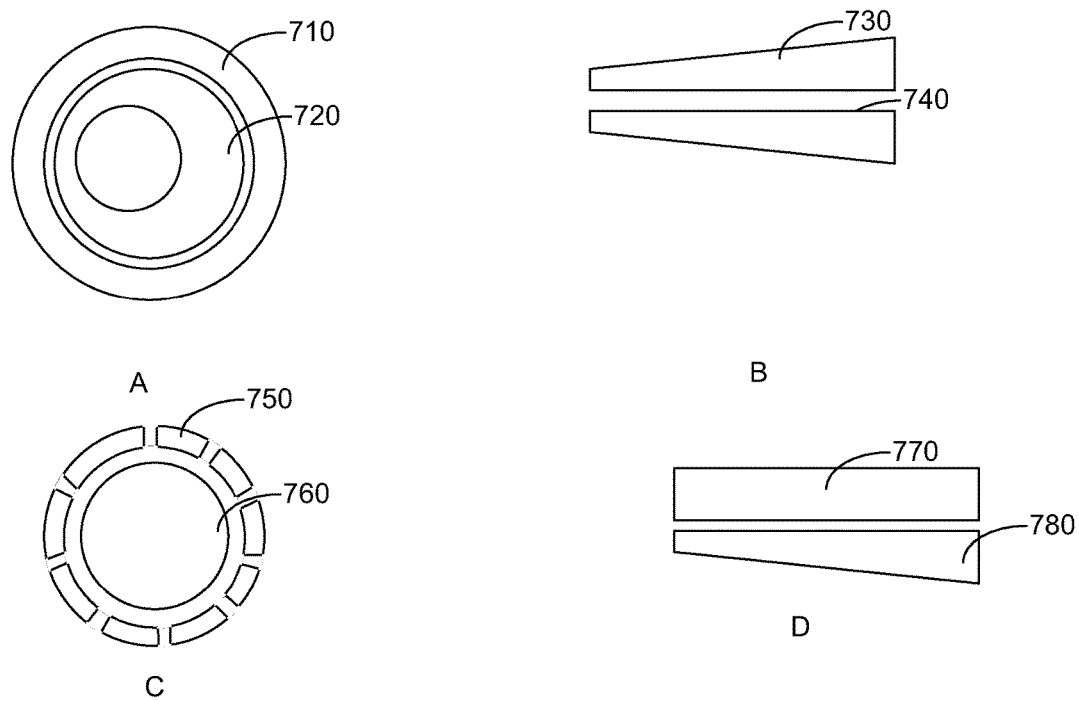
FIG. 7 shows exemplary sensor pad arrangements.

For Sliders as shown in the bottom area of FIG. 6: When the user touches the transparent triangular sensors 230, 235 over the bar graph or the respective sensors 230, 235 added to the back of an LCD, the relative shift of capacitance in both sensors 230, 235 is measured and the ratio is used to set the number of segments to be activated in the display. The various embodiments, in particular with respect to the size and shape of a sensor pad are not restricted to the shown examples. Rather, any type, size and shape of capacitive sensor may be used. Furthermore, even though the 7-segment numbers show two associated sensor pads vertically arranged under or above the respective liquid crystal layer, the various embodiments are not limited to the number of sensor pads. Thus, more than two segments may be arranged over a number or under a number segment which can of course also be any character displayed by a multi-segment display or a dot-matrix display within a low cost LCD display. Hence, a controller may be able to detect more than a simple vertical or horizontal movement as shown in FIGS. 5A-C. For example, circular shaped rings or segmented ring pads may used to detect a circular movement. To this end, FIG. 7 shows some other shapes of sensor pads that may be useful in combination with an LCD. FIGS. 7A-C show circular slider arrangements wherein a first ring 710 may surround an asymmetric second ring 720 as shown in FIG. 7A or ring segments 750 surround a circular pad 760 as shown in FIG. 7C. Different forms for lateral slider can be formed as shown with symmetric pads 730 and 740 in FIG. 7B and asymmetric pads 770 and 780 in FIG. 7D. Other configuration may apply according to various embodiments.

Figure 8:
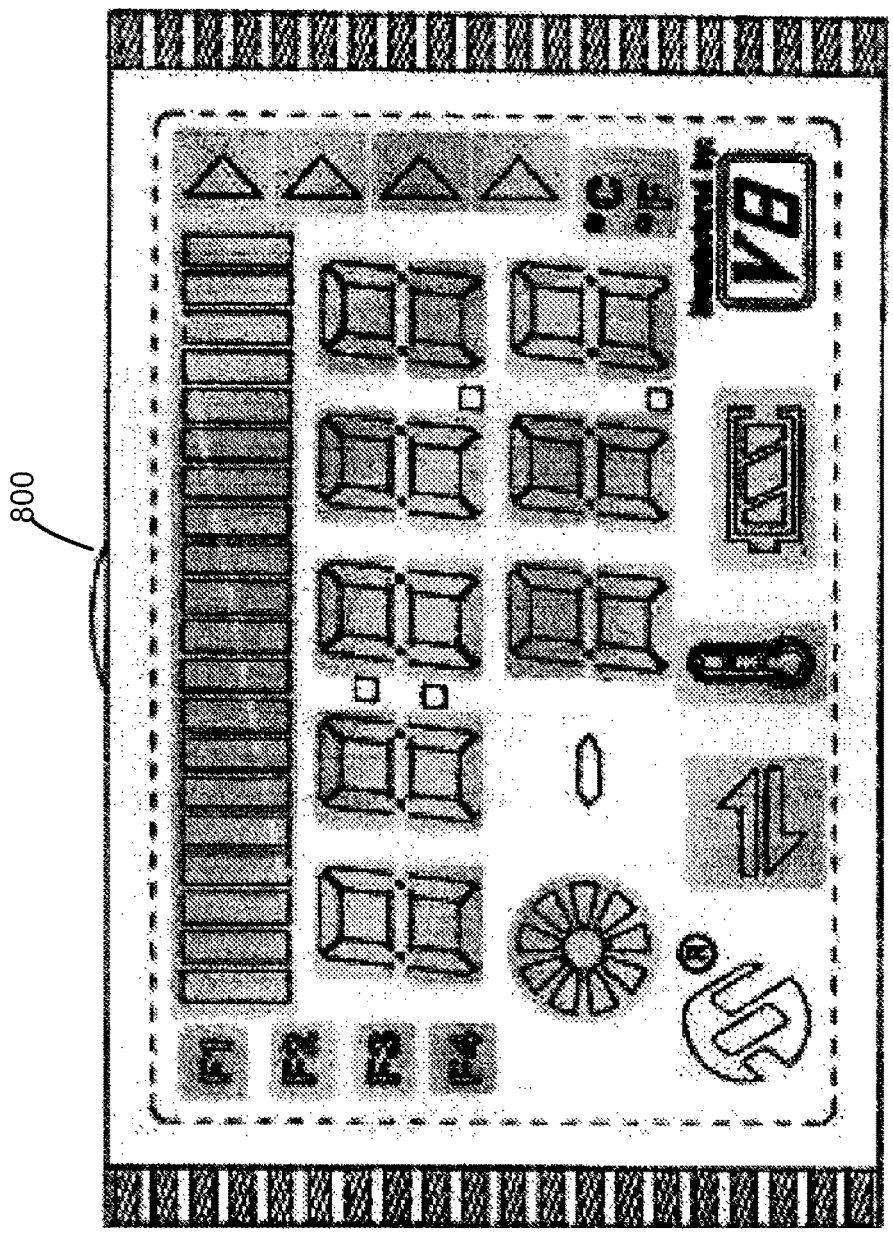
FIG. 8 shows yet another embodiment of a LCD display with capacitive touch functionality.
Figure 9:
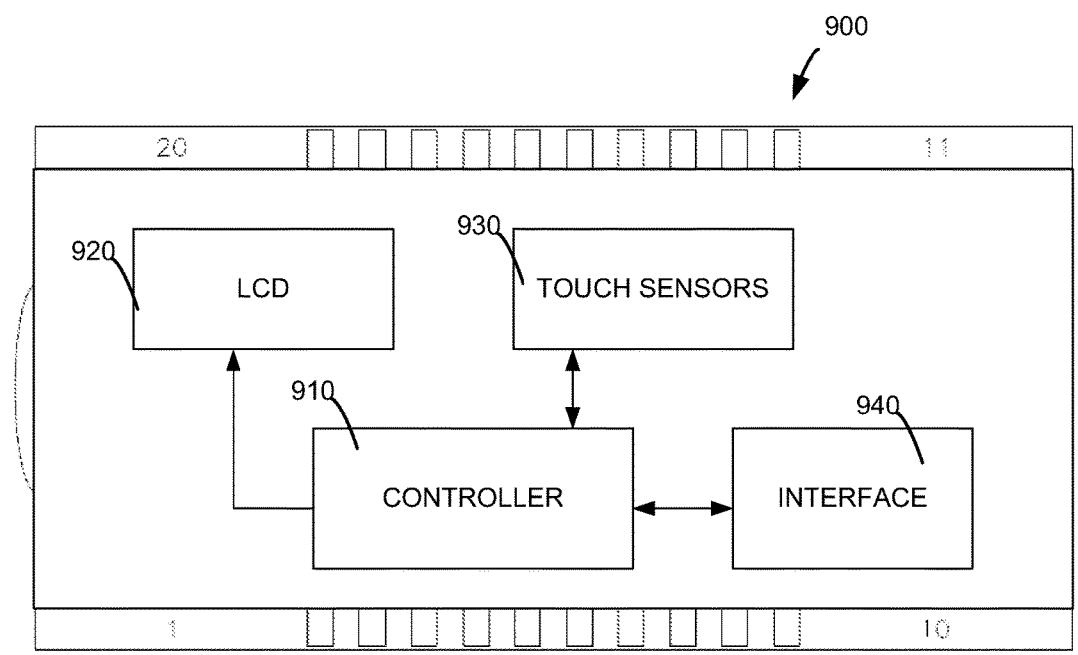
FIG. 9 shows a block diagram of an integrated LCD with controller.

FIG. 8 shows yet another LCD 800 with integrated touch sensor pads and a variety of numerical and graphical symbols. FIG. 9 shows an option in which an LCD controller is integrated within an LCD module 900. Here, a controller 910 such as a state machine or a microcontroller which could also be used for other purposes are integrated within module 900. To this end, the module 900 may either have a circuit board carrying one or more integrated circuit devices or may be manufactured in a chip on glass technology as known in the art of LCD displays. The module 900 may further include the actual LCD display 920, the touch sensors 930 and an interface 940 for coupling with the external pins. The controller 910 may be configured to interpret the respective gestures as discussed above and generate respective signals through interface 940 to a host or may control other devices directly through an integrated microcontroller.

The various embodiments provide for a lower cost solution, and intuitive interface by providing a simple touch based input interface. Thus, for example existing peripherals for input such as provided in a microcontroller can be used. The various embodiments also provide for simple mounting and interface. as discussed above, the capacitive touch sensor pads can be provided within an LCD display or added to the back of an LCD display. In particular according to an embodiment, transparent metal layers can be patterned with conventional technologies to form the respective touch sensor areas within an LCD display.

What is claimed is:

1. An LCD display with integrated capacitive touch sensors comprising:
an LCD display comprising at least one numeric or alphanumeric symbol formed by a plurality of electrodes;
at least a first and second capacitive touch sensor arranged above a display layer or within transparent layers of the LCD display forming the at least one numeric or alphanumerical symbol and wherein the at least first and second capacitive touch sensor is associated with a single numeric or alphanumeric symbol and arranged in a layer above the single numeric or alphanumerical symbol such that the at least first and second capacitive touch sensor at least partly covers and overlays the single numeric or alphanumeric symbol.

2. The LCD display according to claim 1, wherein the at least first and second capacitive touch sensors are formed within a transparent layer integrated within the LCD display and arranged above an LCD electrode layer comprising the plurality of electrodes.

3. The LCD display according to claim 1, wherein the at least first and second capacitive touch sensors is arranged on top of a glass layer of the LCD display.

4. The LCD display according to claim 1, wherein the at least first and second touch sensors are coupled with an external pin of the LCD display.

5. The LCD display according to claim 1, wherein the at least first and second capacitive touch sensors are formed by first and second electrode pads that are separately arranged next to each other and above the single numeric or alphanumeric symbols, wherein a combined surface area of the first and second electrode pads has approximately the same size as a size of the single numeric or alphanumeric symbol.

6. The LCD display according to claim 5, wherein the at least first and second electrode pads are shaped such to provide for a slider functionality.

7. The LCD display according to claim 1, wherein the numeric or alphanumerical symbol is a 7-segment display or a dot-matrix character display.

8. A system comprising an LCD display according to claim 1 and a controller for driving said LCD display and for evaluating the at least first and second touch sensors.

9. The system according to claim 8, wherein the LCD display comprises a plurality of first and second touch sensors each first and second touch sensor associated with one numeric or alphanumeric symbol and wherein the controller is configured to determine a gesture by means of the plurality of first and second touch sensors.

10. The system according to claim 9, wherein the controller is further configured to alter a display information according to a determined gesture.

11. The system according to claim 9, wherein the plurality of first and second touch sensors are used to form at least one of, a touch button, a slider, and a gesture determination button.

12. The system according to claim 8, wherein the controller and LCD display form a module.

13. The system according to claim 12, wherein the module is a chip on glass module.

14. The system according to claim 13, wherein the controller is a microcontroller.

15. The LCD display according to claim 1, further comprising another capacitive touch sensor having a single capacitive touch sensor pad arranged above another numeric or alphanumeric symbol, wherein a surface area of the single capacitive touch sensor pad has approximately the same size as a size of the numeric or alphanumeric symbol.

16. The LCD display according to claim 1, further comprising another capacitive touch sensor comprising a single capacitive touch sensor pad arranged above a group of alphanumeric or graphical symbols, wherein a surface area of the single capacitive touch sensor pad has approximately the same size as a size of the group of alphanumeric or graphical symbols.

17. A method for determining and evaluating an input performed by touching an LCD display comprising:
arranging a first and second touch sensor pads in a layer above a layer comprising electrodes forming segments of a numeric or alphanumeric symbol of the LCD display wherein the first and second sensor pads are arranged adjacent to each other and associated with and overlay and cover at least a part of an associated numeric or alphanumeric symbol formed by said electrodes;
determining a gesture performed across the first and second touch sensor pads;
providing feedback by controlling the LCD display electrodes of the alphanumeric or graphic symbol to display a different numeric or alphanumeric symbol.

18. The method according to claim 17, wherein the first and second touch sensor pads are arranged above a numeric or alphanumeric symbol or within a transparent layer of the LCD display above the numeric or alphanumeric symbol and when a gesture in which a finger slides from the bottom to the top is detected, the feedback comprises displaying an increased number or a next character in a sequence of characters displayed by the associated numeric or alphanumeric symbol under said two touch sensor pads, wherein signals from the first and second touch sensor pads are evaluated to determine the gesture.

19. The method according to claim 18, wherein each gesture shifts the display numbers by one and wherein a last number to the left or right is dropped and a first number to the right or left, respectively is filled with a zero.

20. The method according to claim 17, wherein of the first and second touch sensor pads are arranged above a numeric or alphanumeric symbol or within a transparent layer of the LCD display above the numeric or alphanumeric symbol and when a gesture in which a finger slides from the top to the bottom is detected, the feedback comprises displaying an decreased number or a previous character in a sequence of characters displayed by the associated numeric or alphanumeric symbol under said two touch sensor pads, wherein signals from the first and second touch sensor pads are evaluated to determine the gesture.

21. The method according to claim 17, wherein a plurality of numbers can be displayed by a plurality of numeric or alphanumeric symbols each comprising associated touch pads arranged above the plurality of numeric or alphanumeric symbols, wherein each number comprises at least one associated sensor pad and wherein displayed numbers are shifted from left to right through the plurality of numbers if a gesture is detected in which a finger slides from left to right over the plurality of numbers and wherein displayed numbers are shifted from right to left through the plurality of numbers if a gesture is detected in which a finger slides from right to left over the plurality of numbers.

22. The method according to claim 17, wherein of the first and second touch sensor pads are arranged above a numeric or alphanumeric symbol and when a gesture is detected in which a finger slides from the bottom to the top and further away from the top, the feedback comprises displaying a sequence of increased numbers or next characters in a sequence of characters by the associated numeric or alphanumeric symbol under said two touch sensor pads until a further touch of one of the two sensor pads is detected, wherein signals from the two touch sensor pads are evaluated to determine the gesture.

23. The method according to claim 17, wherein a display plane extends horizontally and vertically and two of the plurality of touch sensor pads are arranged vertically above each other and overlay a numeric or alphanumeric symbol and when a gesture is detected in which a finger slides from the top to the bottom and away from the bottom, the feedback comprises displaying a sequence of decreased numbers or previous characters in a sequence of characters by the associated numeric or alphanumeric symbol under said two touch sensor pads until a further touch of one of the two sensor pads is detected, wherein signals from the two touch sensor pads are evaluated to determine the gesture.

24. An LCD display with integrated capacitive touch sensors comprising:
an LCD display having a surface and comprising at least one seven segment number formed by seven segment electrodes;
a first and second electrode pad arranged in a layer above the seven segment electrodes, wherein a combined surface area of the first and second electrode pads has approximately the same size as a size of the seven segment number and substantially overlays a surface portion of the LCD display occupied by the seven segment number.

* * * * *